US012681811B2

(12) United States Patent
Doshi et al.

(10) Patent No.: US 12,681,811 B2
(45) Date of Patent: Jul. 14, 2026

(54) SYSTEM AND METHOD FOR LARGE NUMBER OF SIMULTANEOUS READ STREAMS FOR DDVE DATA STORED INTO OBJECT STORE

(71) Applicant: Dell Products L.P., Round Rock, TX (US)

(72) Inventors: Girish Balvantrai Doshi, Pune (IN); Vikas Jagannath Chaudhary, Pune (IN)

(73) Assignee: Dell Products L.P., Round Rock, TX (US)

( * ) Notice: Subject to any disclaimer, the term of this patent is extended or adjusted under 35 U.S.C. 154(b) by 501 days.

(21) Appl. No.: 18/184,790

(22) Filed: Mar. 16, 2023

(65) Prior Publication Data

US 2024/0311258 A1 Sep. 19, 2024

(51) Int. Cl.
*G06F 11/1446* (2026.01)
*G06F 9/455* (2018.01)
*G06F 21/60* (2013.01)

(52) U.S. Cl.
CPC ...... *G06F 11/1469* (2013.01); *G06F 9/45558* (2013.01); *G06F 21/602* (2013.01); *G06F 2009/45562* (2013.01); *G06F 2009/4557* (2013.01); *G06F 2201/84* (2013.01)

(58) Field of Classification Search
CPC ................... G06F 11/1469; G06F 2009/45562
See application file for complete search history.

(56) References Cited

U.S. PATENT DOCUMENTS

| | | | |
|---|---|---|---|
| 11,914,731 B1 * | 2/2024 | Velickovic | G06F 21/6218 |
| 2021/0297504 A1 * | 9/2021 | Acar | H04L 67/10 |
| 2023/0043336 A1 * | 2/2023 | Mitkar | G06F 3/0631 |
| 2023/0082186 A1 * | 3/2023 | Balcha | G06F 11/2094 |
| | | | 714/4.11 |
| 2023/0259517 A1 * | 8/2023 | Lipkowitz | G06Q 30/015 |
| | | | 707/803 |
| 2023/0297433 A1 * | 9/2023 | Mishra | G06N 7/01 |
| | | | 718/1 |
| 2024/0111582 A1 * | 4/2024 | Madhuvanthi Janarthanam | G06F 9/5016 |
| 2024/0121095 A1 * | 4/2024 | Sadras Sudhakar | H04L 63/0853 |

* cited by examiner

*Primary Examiner* — Edward J Dudek, Jr.
(74) *Attorney, Agent, or Firm* — Workman Nydegger

(57) ABSTRACT

One example method includes receiving read requests from a backup application, determining whether or not adequate compute instances are available to service the read requests, when adequate compute instances are not available to service the read requests, spawning additional compute instances so that the read requests can be serviced, servicing the read requests using the additional compute instances, and after the read requests have been serviced, spinning down any compute instances that are no longer needed.

20 Claims, 3 Drawing Sheets

SYSTEM AND METHOD FOR LARGE NUMBER OF SIMULTANEOUS READ STREAMS FOR DDVE DATA STORED INTO OBJECT STORE

FIELD OF THE INVENTION

Embodiments of the present invention generally relate to data restoration. More particularly, at least some embodiments of the invention relate to systems, hardware, software, computer-readable media, and methods, for dynamically adjusting a number of read streams as needed to suit changing demands.

BACKGROUND

Backup software writing data onto data storage platforms, such as the DellEMC DataDomain (DD) platform for example, are not able to support lower RTO (recovery time objective) and better SLA (service level agreement) for a large number of simultaneous restores. As a consequence, restore platforms such as the Dell Technologies PowerProtect Cyber Recovery (CR) may be unable to complete full data integrity scanning on data within stipulated time windows. In addition to slow reads on DD, these problems may also be attributed to limits on the number of parallel read streams that can be performed on a given size of a DD configuration due to resource constraints, such as constraints on CPU and memory available for restore operations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
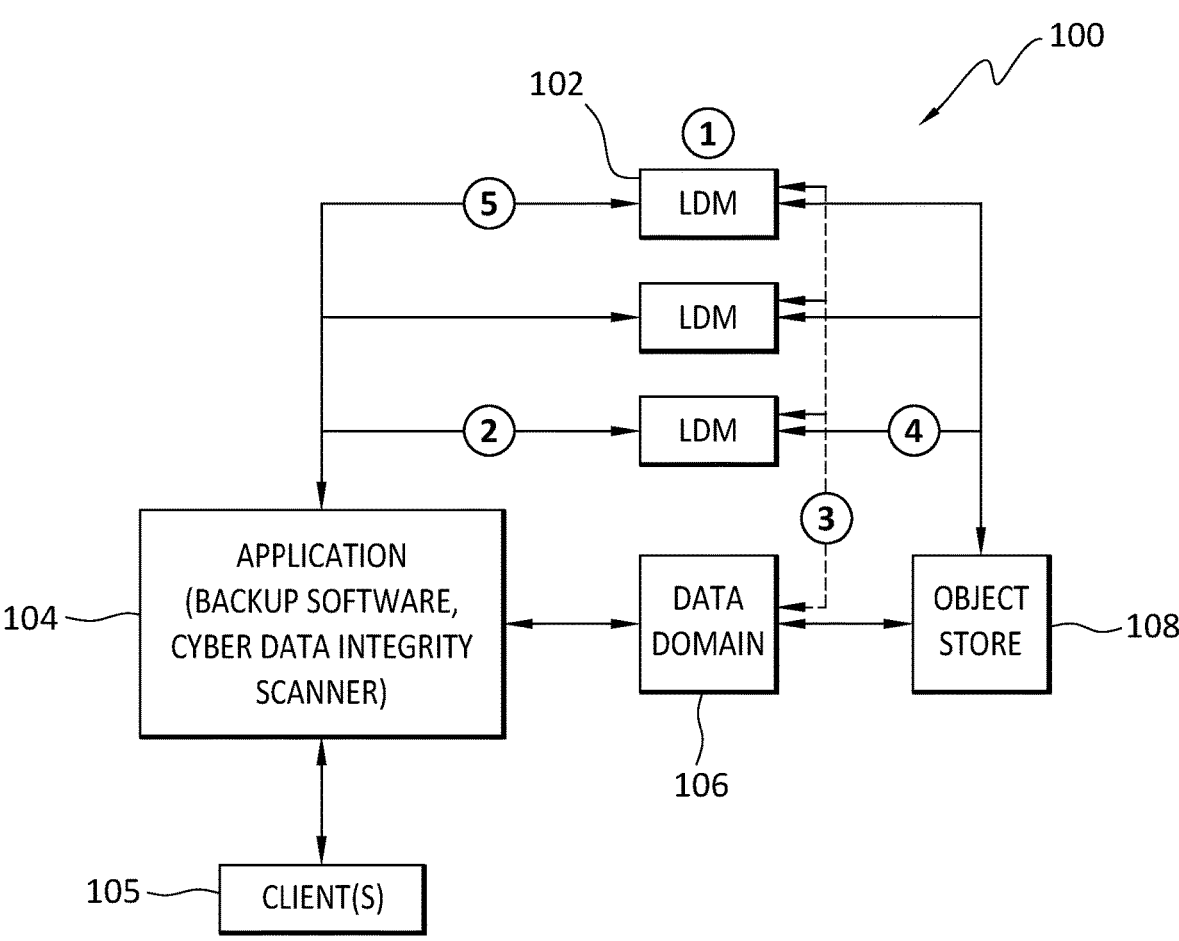
FIG. 1 discloses aspects of an example architecture and method, according to one embodiment.

Embodiments of the present invention generally relate to reading data, such as in connection with restore operations, for example. More particularly, at least some embodiments of the invention relate to systems, hardware, software, computer-readable media, and methods, for dynamically adjusting a number of read streams as needed to suit changing demands.

One example embodiment comprises a method for dynamically adjusting a number of read streams in response to changing demands. In one implementation, a restore process may be initiated and if it is determined, at some point prior to and/or during the restore process, that an adequate number of read streams, such as to support an SLA for example, are not available, then one or more additional read streams may be spawned on-demand as needed to support the restore process.

In more detail, a data backup application, or simply a 'backup application,' that is configured to implement data restore functionality, may spawn one or more on-demand compute instances, that is, restore instances, that are each associated with a respective instance of a lightweight data mover (LDM). In an embodiment, the timing of the spawning, and the number of instances spawned, may be functions of, for example, the amount of data to be restored, SLA requirements such as RTOs, and computing resources, such as memory, processors, and communication bandwidth, that are available to support restore operations. Additional, or alternative, parameters may also be used to determine when, and how many, restore instances will be spawned. After the restore instances are spawned, the backup application may communicate with the LDM instances to provide data access and credentials to the LDM for data restore. The LDM instances may then communicate with respective data store instances which, in an embodiment, may comprise DellEMC Data Domain Virtual Edition (DDVE) instances, to obtain metadata for the file(s) for which a read request has been received. This metadata may b used by the LDM instances to read the requested data and return it to the caller, that is, the backup application. An embodiment of the invention may be hosted, for example, on a server, and performed entirely in an on-premises data storage site, entirely in a cloud data storage site, or in a hybrid storage configuration that includes both on-prem elements, and cloud elements.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the number of read streams may be dynamically scaled, up and down, based on one or more requirements, such as may be specified in an SLA for example. As another example, an embodiment of the invention may provide for maximizing a number of read streams given applicable computing resource constraints, and restore operation performance requirements. Various other advantages of one or more embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for An Embodiment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing data protection platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

One particular embodiment of the invention may be employed in connection with data protection platforms such as Avamar, Power Protect Data Manager (PPDM), which write client data into DataDomain as files. DDVE, in a cloud context, writes the data written to it into a cloud object stores such as S3 object store on AWS, or Blob containers on Azure, as objects. Note that while reference herein is made to various data protection platforms, in connection with which one or more embodiments may be implemented, these data protection platforms are provided for the purposes of illustration and the scope of the invention is not limited to these example data protection platforms.

Before writing it into the object store, DDVE divides the client data file into small chunks sometimes referred to as 'segments,' and then generates hashes for each segment and checks those hashes in it hash DB to filter out duplicate segments and write unique segments into its data storage. DDVE may then update its Hash DB with new hashes information including in which container the segment corresponding a given hash is stored. Data stored is compressed, encrypted before storing. Multiple such segments are bundled together into what is sometimes referred to as a 'container,' and then this container is written into object storage as an object. DDVE also maintains metadata about the file, that is, a list of hashes corresponding to the segments of the file. This metadata may be required when reading back a file from DDVE.

In particular, during a file read request, DDVE may perform the following operations: [1] fetch an ordered list of all the hashes corresponding to the file to be read out; [2] for each hash in the list, fetch the segment details corresponding to that hash—these segment details may include which container the segment is in, identifier/location of the container, the offset in the container where that segment is located, and the length of the segment; [3] read the container from the object store; [4] read the data for the segment from that container; [5] decompress and decrypt the data; and [6] return the segment data to the calling application, that is, the data backup application.

B. General Aspects of An Example Embodiment

Example embodiments of the invention may find applicability in systems and circumstances where a restore platform may otherwise have a maximum number of read streams that can be run in parallel on a given restore instance. For example, an embodiment may be able to maximize restore throughput, or read operations, in cases where computing resources, such as CPU cycles and memory, are constrained. By maximizing restore throughput, an embodiment may be well suited for use in certain scenarios, such as disaster recovery or a cyber-attack, where it may be desirable to implement a large number of system restores so as to recover data in a relatively short span of time, and thus minimize the downtime of business applications. For example, an embodiment may operate to perform a large number of read operations in parallel in order to restore a large number of systems in a relatively faster time than would be possible absent employment of an embodiment of the invention. Further, implementation of an embodiment of the invention in a data restore platform may avoid a situation where a backup application has to wait for running read operations to complete so that the read streams are available for allocation to the next read operation. In an embodiment, these functionalities may be provided by dynamically adding compute resources during such time of need to perform significantly large number of restores in parallel, so as to reducing the time for data recovery by multiple orders of magnitude relative to what the recovery time would be if an embodiment of the invention were not employed.

C. Detailed Discussion

Among other things, an embodiment of the invention may enable implementation of a significantly large number of read streams through additional computing resources, such as CPU and memory for example, by way of on-demand compute instances for anticipating, or responding to, a spike in read request in environments that may include a large/unlimited number of resources, elasticity. Thus, an embodiment may provide a large number of parallel reads from storage, such as an object store, in computing environments such as, but not limited to, public/private cloud environments.

In more detail, an embodiment may comprise a method that may dynamically spawn more compute instances for data movement when all read streams from the data protection platform are exhausted, that is, are in use. In an embodiment, these compute instances, which may be referred to herein as restore instances, may be ephemeral instances created, possibly automatically, only before/during a spike, or other increase which may be gradual or sudden, in read requests and are later decommissioned or spun down, possibly automatically, on completion of the increase in read requests, or after the read requests have declined to a particular level. Note that while reference is made herein to implementation of an embodiment of the invention in a cloud data storage context, one or more embodiments may be applicable to any system that is capable of providing the flexibility of spinning up on demand compute, and that can read data from an underlying storage system, examples of which include, but are not limited to, DDVE.

C.1 Example Systems and Components According to an Embodiment

Figure 2:
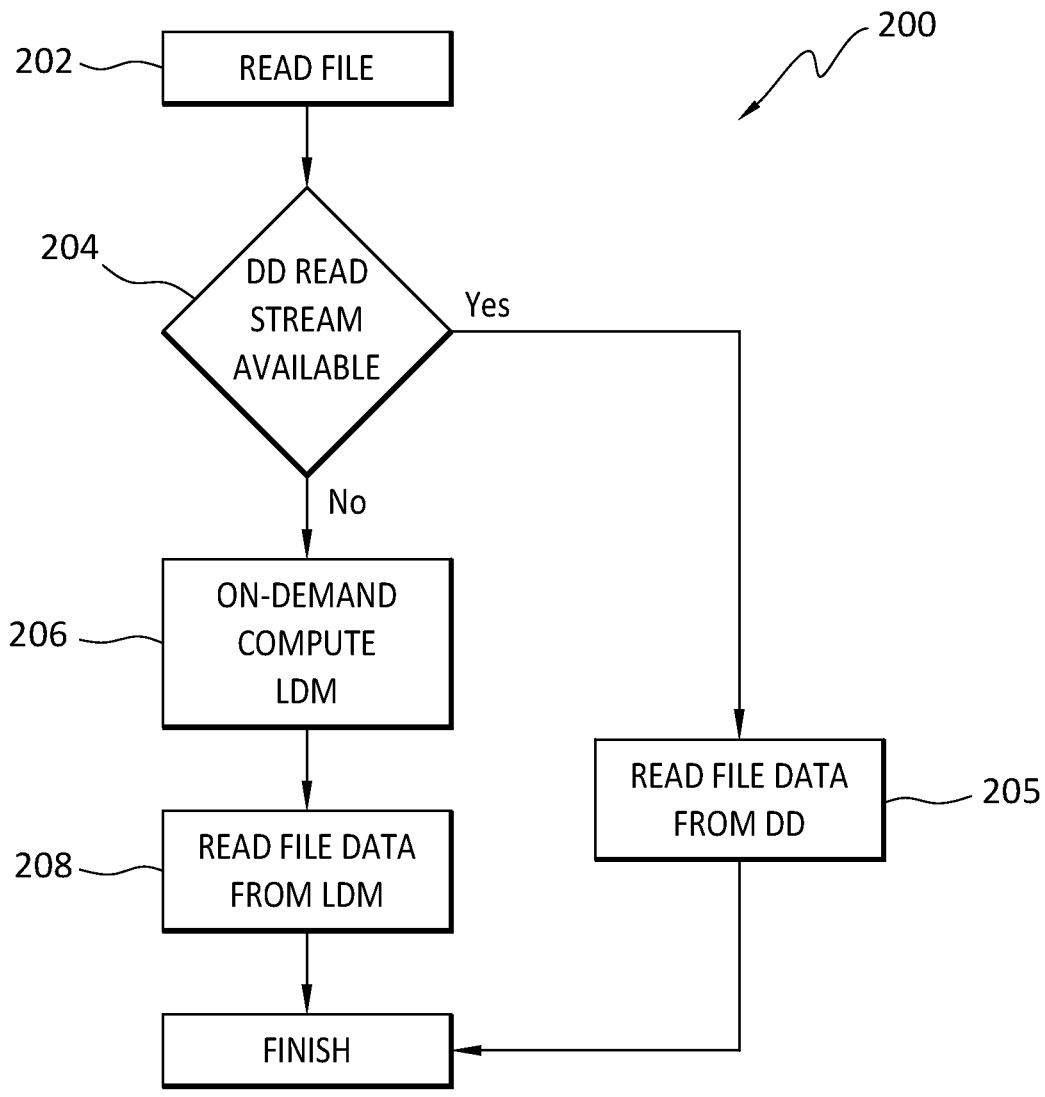
FIG. 2 discloses aspects of an example method according to one embodiment.

With reference now to FIGS. 1 and 2, details are provided concerning some example systems and components according to an embodiment of the invention. As shown in the example architecture 100 in FIG. 1, an embodiment of the invention may employ one or more LDM instances 102 (lean data mover). An LDM instance 102 may comprise a lean software component that supports reading data entities, such as files for example, that have been stored into a data protection system, such as DDVE for example. In an embodiment, the LDM instance 102 may have only data read functionality supported and, as a result, may be significantly lightweight, in terms of its memory and processing requirements for example, as compared to an implementation such as DDVE for example. In general, the LDM instances 102 may comprise interfaces that may be needed to carry out data read operations. These interfaces may be, for example, REST APIs (representational state transfer application program interfaces) or DDBoost (DataDomain Boost) APIs.

Some data backup software may use the DDBoost (see, e.g., https://www.dell.com/support/kbdoc/en-us/000061966/what-is-ddboost-plug-in) protocol for writing and reading data into DDVE. Thus, in one example embodiment, supporting all required Boost interfaces to read data may be desirable. In this way, no changes may be required to the data backup software as far as data reading is concerned. In an embodiment, some of the DDBoost API implementations may be enhanced. By way of illustration, the ddp_open_file API, and the dp_read API, may be enhanced, in an embodiment, to fetch metadata information as explained below, and may then use that metadata to read data, such as from an object store for example, and then return that data to a caller such as the application 104.

In an embodiment, the application 104 may comprise data backup software and a cyber data integrity scanner. Note that while the application 104 may comprise data backup software, that data backup software, which may comprise a data backup application, may comprise not only data backup functionality, but also data restore functionality. No particular implementation of an application is required for any embodiment. Finally, the application 104 may receive data from, and transmit data to, one or more clients 105 that generate new and modified data during normal production operations. By way of illustration, a client 105 may generate new/modified data for backup and the application 104 may back up that data at a storage site. That data may later be retrieved from storage by the application 104, such as in response to a request from the client 105, and/or from another entity.

With continued reference to FIG. 1, the example architecture 100 may also comprise one or more data protection system (DPS) interfaces 106, such as DDVE interfaces in one example embodiment, that are able to communicate with the LDM instances 102. In general, the DPS interfaces 106 may enable the accessing and retrieval of hash list and segment details, among other things. In more detail, a data protection platform, which may take the form of an enhanced DD platform in one embodiment, may comprise external interfaces, such as the REST and BOOST APIs referred to earlier, that may be used to retrieve, such as from an object store 108 for example, [1] an ordered list of hashes corresponding to a given data entity, such as a file for example, on the data protection platform, and [2] for hashes in the list, segment details corresponding to those hashes.

Examples of segment details may include which container a segment is located in, that is, the identifier and location of the container. To illustrate with a cloud object store example, the segment details may identify a particular Amazon® S3 (Simple Storage Service) cloud storage bucket, and the container in that bucket that includes the segment. Another example of segment details is the length of a segment. As a final example, segment details may indicate the offset, within a container for example, where the segment is located.

With continued reference to the example of FIG. 1, an embodiment of the invention may provide for on-demand compute, that is, for example, for containers or VMs (virtual machines) to run LDM instances 102 that would perform read operations. As disclosed elsewhere herein, this on-demand compute may comprise one or more restore instances spawned to meet a particular demand.

C.2 Example Method According to One Embodiment

With continued reference to FIG. 1, and directing attention now to FIG. 2 as well, an example method according to one embodiment is denoted generally at 200. In an embodiment, a read request 202 may be received that indicates data, such as one or more files, is to be read out of storage. While FIG. 2 refers to reading of a file, it should be understood that in an embodiment, multiple files and/or other data may be the subject of read requests. That is, in an embodiment, multiple read requests 202 may be received in serial order, or in parallel, or in some combination of these two orders. Further, in an embodiment, a single read request 202 may specify multiple files, or other groupings of data, that are to be read out.

After the read request 202 is received, a check 204 may be performed to determine whether or not any read streams are available to service the read request. In an embodiment, the backup application would consume as many read streams as it has capacity for. Thus, the check 204 may determine whether or not any capacity remains. If so, then the method may advance to 205 and the requested data read out.

On the other hand, if all the possible read streams of the backup application are exhausted, then the method may advance to 206, where data for the file(s) identified in the read request 202 is read out 208 using one or more LDMs. Note that in an embodiment, the read out process 208 referred to in FIG. 2 may comprise the operations disclosed in FIG. 1.

In more detail, and with continued reference to FIGS. 1 and 2, the backup application may spawn one or more on-demand compute instances, or restore instances, that each have the LDM software, or an LDM instance. The number of compute instances that are spawned may be a function of the number of read requests 202 that have been received by a backup application and/or the number of files specified in one or more read requests. An on-demand compute instance may comprise, for example a container or VM that virtualizes a particular amount of CPU and memory. In an embodiment, the size of a compute instance, such as in terms of the computing resources associated with it, may be configurable. The compute instance size may be configured on the fly as the compute instance is being spawned so that after spawning, the compute instance is immediately available to perform read operations. As noted herein, the backup application may spawn any number of compute instances, based upon the restore workload on the system, as may be indicated by the number of read requests 202 received.

After the read requests have been received 202, and compute instances spawned, the backup application may then communicate with the LDM(s), is indicated at '1' in FIG. 1, using an API, such as the REST/DDBoost interfaces, for example. Any other suitable API may alternatively be employed. As shown at '2' in FIG. 1, the backup application may pass access details 2, such as a Data Domain FQDN (fully qualified domain name, such as a complete URL for example) and/or other access credentials to LDM. These credentials may be used by the LDM(s) to communicate with a data protection platform, such as DDVE for example, to fetch '3' metadata details about a data entity, such as a file for example. Also at '2,' the LDM(s) may call APIs to open and/or read the files identified in a read request. For example, an LDM may call the DDBoost APIs, such as ddp_open_file and/or ddp_read, to read file data from storage.

Next, at '3,' and LDM may communicate with the data protection system, which may comprise one or more DDVE instances in an embodiment, to fetch metadata details for the file, or files, for which a read request is received. Such metadata may include, but is not limited to: [1] an ordered list of hashes corresponding to the segments of the requested file; and [2] details about the segments. As noted elsewhere herein, examples of segment details may include which container a segment is located in, that is, the identifier and location of the container, such as in an object store for example. To illustrate with a cloud object store example, the segment details may identify a particular Amazon® S3 (Simple Storage Service) cloud storage bucket, and the container in that bucket that includes the segment. Another example of segment details is the length of a segment. As a final example, segment details may indicate the offset, within a container for example, where the segment is located.

At '4' in FIG. 1, an LDM may use the information obtained in '3' to read segment data from an object store. The LDM may then decrypt the segment data and decompress the segment data. The decrypted and decompressed segment data may then be returned '5' by the LDM to the caller, that is, the backup application.

D. Further Discussion

As will be apparent from this disclosure, one or more embodiments may possess various useful features and aspects. For example, an embodiment may provide better, such as faster, RTO/SLA support for large data recovery use cases like disaster recovery, as compared with approaches that have only a fixed number of read streams available. An embodiment may enable performance of full data integrity checks by performing relatively fast reads on large data sets to check for cyber threats. Further, an embodiment may enable performance of fast data integrity scanning on large datasets within a stipulated time window. As another example, an embodiment may provide for the use of relatively lower cost compute instances that are only spawned when needed, and are ephemeral such that they can be shut down when no longer needed, thus avoiding the need to keep compute instances running at all times. Further, an embodiment may provide automatic scale up/down flexibility, based on read operation loading, with regard to the number of compute instances in use and, as such, may improve upon approaches where only a fixed number of compute instances are available.

E. Example Methods

It is noted with respect to the disclosed methods, including the example methods of FIGS. 1 and 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: receiving read requests from a backup application; determining whether or not adequate compute instances are available to service the read requests; when adequate compute instances are not available to service the read requests, spawning additional compute instances so that the read requests can be serviced; servicing the read requests using the additional compute instances; and after the read requests have been serviced, spinning down any compute instances that are no longer needed.

Embodiment 2. The method as recited in any preceding embodiment, wherein the spawning of the additional compute instances is performed automatically based on the read requests that have been received.

Embodiment 3. The method as recited in any preceding embodiment, wherein the spinning down of the compute instances that are no longer needed is performed automatically.

Embodiment 4. The method as recited in any preceding embodiment, wherein one of the additional compute instances is configurable at a time when it is being spawned.

Embodiment 5. The method as recited in any preceding embodiment, wherein each of the additional compute instances comprises a respective lightweight data mover (LDM) that performs the servicing of one of the read requests.

Embodiment 6. The method as recited in embodiment 5, wherein the LDM obtains metadata details for a file that has been identified in a read request.

Embodiment 7. The method as recited in embodiment 6, wherein the LDM receives data access credentials from the backup application, and the LDM uses the data access credentials to obtain the metadata details.

Embodiment 8. The method as recited in embodiment 7, wherein the LDM uses the metadata details to read segment data, for a file, from an object store, and the LDM decrypts the segment data, decompresses the decrypted segment data, and returns the decrypted and decompressed segment data to the backup application.

Embodiment 9. The method as recited in any preceding embodiment, wherein the additional compute instances service the read requests in parallel.

Embodiment 10. The method as recited in any preceding embodiment, wherein one of the compute instances comprises a virtual machine, or a container.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
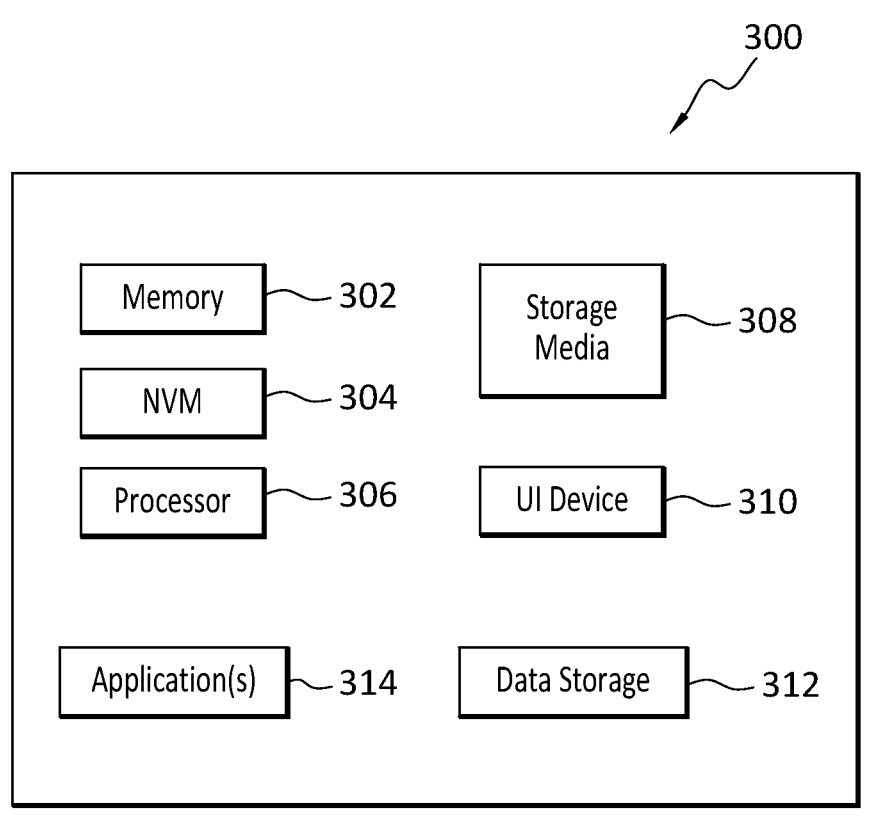
FIG. 3 discloses aspects of a computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving read requests, each read request issued by a backup application to retrieve previously stored backup data;

determining, for each read request, whether or not a compute instance dedicated to servicing that read request is available;

when no such compute instance is available for the read request, spawning a lightweight data mover compute instance specifically for that read request;

servicing the read request using only the lightweight data mover compute instance spawned for that read request; and after completion of the read request, automatically terminating the lightweight data mover compute instance that serviced the read request, wherein the lightweight data mover compute instance is not reused to service a different read request after termination.

2. The method as recited in claim 1, wherein the spawning of the lightweight data mover compute instance is performed automatically based on the read request that has been received.

3. The method as recited in claim 1, wherein termination of the lightweight data mover compute instance is performed automatically immediately after the corresponding read request is fully serviced.

4. The method as recited in claim 1, wherein the lightweight data mover compute instance is configurable at a time when it is being spawned for the read request.

5. The method as recited in claim 1, wherein no lightweight data mover compute instance services more than one read request.

6. The method as recited in claim 5, wherein the lightweight data mover compute instance obtains metadata details for a file that has been identified in the read request.

7. The method as recited in claim 6, wherein the lightweight data mover compute instance receives data access credentials from the backup application, and the lightweight data mover compute instance uses the data access credentials to obtain the metadata details.

8. The method as recited in claim 7, wherein the lightweight data mover compute instance uses the metadata details to read segment data, for a file, from an object store, and the lightweight data mover compute instance decrypts the segment data, decompresses the decrypted segment data, and returns the decrypted and decompressed segment data to the backup application.

9. The method as recited in claim 1, wherein multiple lightweight data mover compute instances service different read requests in parallel, each lightweight data mover compute instance servicing only a single read request.

10. The method as recited in claim 1, wherein the lightweight data mover compute instance comprises a virtual machine, or a container.

11. A non-transitory storage medium having stored therein instructions that are executable by one or more hardware processors to perform operations comprising:

receiving read requests, each read request issued by a backup application to retrieve previously stored backup data;

determining, for each read request, whether or not a compute instance dedicated to servicing that read request is available;

when no such compute instance is available for the read request, spawning a lightweight data mover compute instance specifically for that read request;

servicing the read request using only the lightweight data mover compute instance spawned for that read request; and after completion of the read request, automatically terminating the lightweight data mover compute instance that serviced the read request, wherein the lightweight data mover compute instance is not reused to service a different read request after termination.

12. The non-transitory storage medium as recited in claim 11, wherein the spawning of the lightweight data mover compute instance is performed automatically based on the read request that has been received.

13. The non-transitory storage medium as recited in claim 11, wherein termination of the lightweight data mover compute instance is performed automatically immediately after the read request is fully serviced.

14. The non-transitory storage medium as recited in claim 11, wherein the lightweight data mover compute instance is configurable at a time when it is being spawned for the read request.

15. The non-transitory storage medium as recited in claim 11, wherein no lightweight data mover compute instance services more than one read request.

16. The non-transitory storage medium as recited in claim 15, wherein the lightweight data mover compute instance obtains metadata details for a file that has been identified in the read request.

17. The non-transitory storage medium as recited in claim 16, wherein the lightweight data mover compute instance receives data access credentials from the backup application, and the lightweight data mover compute instance uses the data access credentials to obtain the metadata details.

18. The non-transitory storage medium as recited in claim 17, wherein the lightweight data mover compute instance uses the metadata details to read segment data, for a file, from an object store, and the lightweight data mover compute instance decrypts the segment data, decompresses the decrypted segment data, and returns the decrypted and decompressed segment data to the backup application.

19. The non-transitory storage medium as recited in claim 11, wherein multiple lightweight data mover compute instances service different read requests in parallel, each lightweight data mover compute instance servicing only a single read request.

20. The non-transitory storage medium as recited in claim 11, wherein the lightweight data mover compute instance comprises a virtual machine, or a container.

* * * * *